US006263444B1

United States Patent
Fujita

(12) United States Patent
(10) Patent No.: US 6,263,444 B1
(45) Date of Patent: Jul. 17, 2001

(54) NETWORK UNAUTHORIZED ACCESS ANALYSIS METHOD, NETWORK UNAUTHORIZED ACCESS ANALYSIS APPARATUS UTILIZING THE METHOD, AND COMPUTER-READABLE RECORDING MEDIUM HAVING NETWORK UNAUTHORIZED ACCESS ANALYSIS PROGRAM RECORDED THEREON

(75) Inventor: Naoyuki Fujita, Koganei (JP)

(73) Assignees: National Aerospace Laboratory of Science & Technology Agency, Tokyo; Japan Science & Technology Corp., Saitama, both of (JP)

( * ) Notice: Subject to any disclaimer, the term of this patent is extended or adjusted under 35 U.S.C. 154(b) by 0 days.

(21) Appl. No.: 09/035,316

(22) Filed: Mar. 5, 1998

(30) Foreign Application Priority Data

Mar. 11, 1997 (JP) ................................... 9-056715

(51) Int. Cl.⁷ ........................................ H04L 9/00
(52) U.S. Cl. ................. 713/201; 713/200; 380/255; 380/270; 370/94.1
(58) Field of Search ..................... 713/201, 200; 380/270, 255; 382/115; 370/94.1

(56) References Cited

U.S. PATENT DOCUMENTS

| | | | | |
|---|---|---|---|---|
| 5,124,984 | * | 6/1992 | Engel | 370/94.1 |
| 5,444,850 | | 8/1995 | Chang . | |
| 5,471,459 | * | 11/1995 | Gut | 370/13 |
| 5,577,209 | * | 11/1996 | Boyle et al. | 713/201 |
| 5,615,277 | * | 3/1997 | Hoffman | 382/115 |
| 5,623,600 | | 4/1997 | Ji et al. . | |
| 5,673,317 | * | 9/1997 | Cooper | 380/270 |
| 5,680,547 | | 10/1997 | Chang . | |
| 5,692,124 | * | 11/1997 | Holden et al. | 713/201 |
| 5,757,924 | * | 5/1998 | Friedman et al. | 713/201 |
| 5,765,106 | * | 6/1998 | Violante et al. | 455/410 |
| 5,778,368 | * | 7/1998 | Hogan et al. | 707/10 |
| 5,796,942 | * | 8/1998 | Esbensen | 713/201 |
| 5,828,832 | * | 10/1998 | Holden et al. | 713/201 |
| 5,832,228 | * | 11/1998 | Holden et al. | 709/224 |
| 5,852,666 | * | 12/1998 | Miller et al. | 380/255 |
| 5,940,591 | * | 8/1999 | Boyle et al. | 713/201 |
| 5,987,611 | * | 11/1999 | Freund | 713/201 |

FOREIGN PATENT DOCUMENTS 1-274545    11/1989  (JP) .

OTHER PUBLICATIONS

W.R. Cheswick et al., "Fire Wall", Soft Bank 1995, pp. 128–129.

* cited by examiner

Primary Examiner—Thomas Lee
Assistant Examiner—Nguyên Nguyên
(74) Attorney, Agent, or Firm—Notaro & Michalos P.C.

(57) ABSTRACT

The present invention relates to a network unauthorized access analysis method, a network unauthorized access analysis apparatus utilizing this method and a computer-readable recording medium having a network unauthorized access analysis program recorded thereon, and is capable of processing arbitrary data, performing arbitrary communication between networks, easily dealing with an increase in a number of protocols and coping with arbitrary protocols. A network unauthorized access analysis system 50 for realizing these features analyzes an unauthorized access on a network performing communication between information communication stations by using a layered protocol and includes: a data collecting section 55 for capturing a packet PT transmitted on a network 3; a data creating section 56 for creating analysis data DT by setting parameters of layered modules according to a layered protocol based on information of a previously-read configuration file and processing the packet from the data collecting section by the layered modules; and a data analyzing section 57 for judging whether an unauthorized access is generated in the analysis data DT based on the content described in that file.

24 Claims, 12 Drawing Sheets

FIG. 4

```
#------------------------------------------------------------------#
# Filter for login Analyzer                                        #
#------------------------------------------------------------------#
filterset {
    physical  = { ether: * <-> aa:bb:cc:xx:yy:zz }
    network   = { ip: * <-> 202.26.95.68 }
    transport = { tcp: * <-> 23 }
    analyzer  = { login-A login.conf -log login.log -dump login.dump}
}
```

FIG. 9

```
                                                          ┌─ 900
┌─────────────────────────────────────────────────────────┐
│ -------- Cracking Data contents ----------------------- │
│ Date               : Dec 26 13:28:00 1996               │
│ Server Address     : 202.26.95.68:23                    │
│ Client Address     : 202.26.95.69:1024                  │
│ Defhost Name       : host1                              │
│ Login Times        : Threshold User = 0  Threshold System = 3 │
│ Easy Password Used : NO                                 │
│                                                         │
│ -------- Command Details ----------------------------   │
│ S :                                                     │
│ S : Welcome to mail.nal.go.jp (ttyp4)                   │
│ S :                                                     │
│ S : login:                                              │
│ C : root                                                │
│ S : Password:                                           │
│ C : rootS                                               │
│ S : Login incorrect                                     │
│ S : login:                                              │
│ C : root                                                │
│ S : Password:                                           │
│ C : root                                                │
└─────────────────────────────────────────────────────────┘
``` analysis result

NETWORK UNAUTHORIZED ACCESS ANALYSIS METHOD, NETWORK UNAUTHORIZED ACCESS ANALYSIS APPARATUS UTILIZING THE METHOD, AND COMPUTER-READABLE RECORDING MEDIUM HAVING NETWORK UNAUTHORIZED ACCESS ANALYSIS PROGRAM RECORDED THEREON

BACKGROUND OF THE INVENTION

1. Field of the Invention

The present invention relates to a network unauthorized access analysis method, an apparatus utilizing the method, and a computer-readable recording medium having a network unauthorized access analysis program recorded thereon. More particularly, the present invention relates to a network unauthorized access analysis method for analyzing whether an unauthorized access is generated in data transmitted on a network so constructed as to perform communication based on a layered protocol between information communication stations in order to enable execution of network security or network management, an apparatus using such a method, and a computer-readable recording medium having a network unauthorized access analysis program recorded thereon.

2. Description of the Prior Art

Conventionally, in a system so structured as to exchange data between information stations, there have been proposed various kinds of analysis method for analyzing whether an unauthorized access is generated in data to be exchanged.

In the first place, as a first prior art of the analysis method, for example, there has been proposed an analysis system which operates on a layer or layers being upper side of a transport layer in a seven-layer model, receives the transmitted information from the transport layer, and checks a source based on a function prepared by an operating system in order to judge whether the source has been registered in advance and is admitted (TCP WRAPPER; Mar. 19, 1996).

Further, as a second prior art of the analysis method, there is a software which does not use functions of the network communication, compresses the vast content of a hard disk by using a predetermined compression method, and detects an unauthorized access to the hard disk by periodically comparing the stored content with the current compressed content (The Design and Implementation of Tripwire; Feb. 23, 1995).

As a third prior art of the analysis method, there is one such that a typical unauthorized access (cracking) technique is stored and the technique is executed with respect to a system to be analyzed to check the unauthorized access of that system (Satan-network security scanner).

Further, as a fourth prior art of the analysis method, there is one such that analysis is performed with respect to each host computer to confirm whether the various settings of the host computer is disadvantageously set so that it is cracked by the network communication. In this prior art, confirmation is made by using commands of an operating system upon whether the various settings of the host computer is unsafe in terms of security (COPS; Nov. 17, 1991).

A fifth prior art of the analysis method is a system for checking whether a password of a user employed in the UNIX is valid. This system has a file of proposed passwords to code the proposed words, compares created words resulting from coding with the coded password, and retrieves the password by utilizing a fact that the currently coded word is the password if they coincide with each other (Crack Version 4.1; Mar. 3, 1992).

As a sixth prior art of the analysis method, there is one for analyzing each packet in a physical layer (Sniffer).

Moreover, as a seventh prior art of the analysis method, there is a system for diagnosing a network which performs communication between information stations based on a layered protocol. According to this system, a service data unit provided from a lower layer filter is analyzed in accordance with analysis directions from an input controller and a service data unit is created and provided to an upper layer filter (Japanese patent laid-open publication No. Hei 4-315343).

However, the first prior art has a drawback such that a number of items of data to be analyzed is small and it is not enough for analyzing unauthorized access because data is received from only the transport layer and no data is sent from any other layer. Further, since using functions of the operating system restructures data, satisfactory analysis of unauthorized access can not be carried out.

The second prior art has such a disadvantage, as that analysis of unauthorized access in data in the network communication is impossible because of lack of network communication functions.

In addition, according to the first and second prior arts, there is adopted a design for installing a program which realizes the analysis method in accordance with each host computer or host station (which will be simply referred to as "host" hereunder) to be monitored, and hence the system can not deal with an increase in a number of hosts.

According to the third through fifth prior arts, adoption of a design for newly performing analysis in accordance with each analysis protocol involves the system to fail to cope with an increase in a number of protocols.

The sixth prior art adopts a design such as that analysis is effected each packet in the physical layer, which makes it impossible to perform analysis each session in application layer that is necessary in cracking analysis.

On the other hand, according to the seventh prior art, since data in one layer is filtered and diagnosed based on the same module in accordance with each layer of the protocol, the unauthorized access can not be analyzed in association with other layers, and the unauthorized access analysis is not enough.

DISCLOSURE OF THE INVENTION

It is, therefore, a first object of the present invention to provide a network unauthorized access analyzing method which can process arbitrary data including sessions of the application, a network unauthorized access analysis apparatus utilizing this method, and a computer-readable recording medium having a network unauthorized access analysis program recorded thereon.

Further, it is a second object of the present invention to provide a network unauthorized access analyzing method which can perform arbitrary communication between networks and easily deal with an increase in a number of protocols, a network unauthorized access analysis apparatus utilizing this method, and a computer-readable recording medium having a network unauthorized access analysis program recorded thereon.

Furthermore, it is a third object of the present invention to provide a network unauthorized access analysis method which can deal with an arbitrary protocol, a network unauthorized access analysis apparatus utilizing this method, and a computer-readable recording medium having a network unauthorized access analysis program recorded thereon.

To achieve the first through third objects, the present invention provides a network unauthorized access analysis method for analyzing an unauthorized access in a network so constructed as to perform communication based on a layered protocol between information communication stations, the method including: a data collecting step for capturing a packet transmitted on a network; a data creating step for setting parameters of layered modules according to a layered protocol based on information specified by a previously-read configuration file and filtering the packet obtained from the data collecting step by using the layered modules to reassemble the fragmented data which is the packet into its original data in order to create analysis data; and a data analyzing step for judging whether an unauthorized access is generated in the analysis data obtained in the data creating step based on the content specified by the previously-read configuration file.

In the data creating step, therefore, the packet obtained from the data collecting step is filtered based on the layered modules and the fragmented data which is the packet is reassembled into the original data to create the analysis data, and hence the analysis data obtained after reassemblage which has a significance as data is to be analyzed in the data analyzing step. Thus, the unauthorized access generated in the data portion can be easily recognized.

In particular, although it is effective to analyze the data portion because the unauthorized access in the network is likely to be generated in the data portion, the packet transmitted on the network has the data portion fragmented, which makes it difficult to judge whether the unauthorized access is generated in the data portion. On the other hand, the significant data obtained after reassemblage is to be analyzed in the present invention, and it is easy to make judgment upon whether the unauthorized access is generated in the data portion.

Further, in the network unauthorized access analysis method according to the present invention, the layered modules includes a plurality of layer modules, for performing filtering and layer reassemblage in accordance with the content of the previously-read configuration file, in the form of a layer. This layer module preferably consists of seven layers and is also preferably layered into a physical layer, a data link layer, a network layer, a transport layer, a session layer, a presentation layer, an application layer in the bottom-up order.

Further, in the network unauthorized access analysis method according to the present invention, the data collecting step includes: a data collection processing step for capturing a packet to apply data processing thereto and supplying it to the data creating step; and a data collection controlling step for controlling the data collection processing of the data collection processing step.

Furthermore, in the network unauthorized access analysis method according to the present invention, the data creating step includes: a layered modules step for creating analysis data by filtering the packet from the data collecting step based on the setting and reassembling the fragmented data which is the packet into its original data; and control managing step for controlling and managing the layered modules by setting parameters of the layered modules according to a layered protocol based on information specified by a previously-read configuration file. This control managing step includes: a data creation controlling step for creating data in each layer module; a memory controlling step for controlling storage of data in each layer module; and an analyzer managing step for outputting analysis data.

Moreover, in the network unauthorized access analysis method according to the present invention, the data analyzing step includes a step for analyzing whether there is an unauthorized access to data of the sessions in application layer.

Further, the present invention provides a network unauthorized access analyses apparatus for analyzing an unauthorized access in a network so constructed as to perform communication between information communication stations based on a layered protocol, the apparatus including: a data collecting section for capturing a packet transmitted on a network; a data creating section for setting parameters of layered modules according to a layered protocol based on information specified by a previously-read configuration file and filtering the packet obtained from the data collecting section by using the layered modules to reassemble the fragmented data which is the packet into its original data in order to create analysis data; and a data analyzing section for judging whether an unauthorized access is generated in the analysis data obtained from the data creating section based on the content specified by the previously-read configuration file.

In the data creating section, therefore, the packet obtained from the data collecting section is filtered based on the layered modules and the fragmented data which is packet is reassembled into the original data to create the analysis data, and hence the analysis data obtained after reassemblage which has a significance as data is to be analyzed in the data analyzing section. Thus, the unauthorized access generated in the data portion can be easily recognized.

Further, in the network unauthorized access analysis apparatus according to the present invention, the layered modules includes a plurality of layer modules, for performing filtering and layer reassemblage in accordance with the content of the previously-read configuration file, in the form of a layer. This layer module preferably consists of seven layers and is also preferably layered into a physical layer, a data link layer, a network layer, a transport layer, a session layer, a presentation layer, an application layer in the bottom-up order.

Further, in the network unauthorized access analysis apparatus according to the present invention, the data collecting section includes: a data collection processing section for capturing a packet to apply data processing thereto and supplying it to the data creating section; and a data collection controlling section for controlling the data collection processing of the data collection processing section.

Furthermore, in the network unauthorized access analysis apparatus according to the present invention, the data creating section includes: layered modules for creating analysis data by filtering the packet from the data collecting section based on the setting and reassembling the fragmented data which is the packet into its original data; and control managing section for controlling and managing the layered modules by setting parameters of the layered modules according to a layered protocol based on information specified by a previously-read configuration file. This control managing section includes: a data creation controlling section for creating data in each layer module; a memory controlling section for controlling storage of data in each layer module; and an analyzer managing section for outputting analysis data.

Moreover, in the network unauthorized access analysis apparatus according to the present invention, the data analyzing section includes an application analyzer for analyzing whether there is an unauthorized access to data of the sessions in application layer.

On the other hand, on a computer-readable recording medium according to the present invention having a network unauthorized access analysis program recorded thereon is recorded a program for causing a computer to execute: a data collecting procedure for capturing a packet transmitted on a network; a data creating procedure for setting parameters of layered modules according to a layered protocol based on information specified by a previously-read configuration file and filtering the packet obtained from the data collecting procedure by using the layered modules to reassemble the fragmented data which is the packet into its original data in order to create analysis data; and a data analyzing procedure for judging whether an unauthorized access is generated in the analysis data obtained from the data creating procedure based on the content specified by the previously-read configuration file.

In the data creating procedure, therefore, the packet obtained from the data collecting procedure is filtered based on the layered modules and the fragmented data which is packet is reassembled into the original data to create the analysis data, and hence the analysis data obtained after reassemblage which has a significance as data is to be analyzed in the data analyzing procedure. Thus, the unauthorized access generated in the data portion can be easily recognized.

In the computer-readable recording medium having a network unauthorized access analysis program recorded thereon, the layered modules includes a plurality of layer modules, for performing filtering and layer reassemblage in accordance with the content of the previously-read configuration file, in the form of a layer. This layer module preferably consists of seven layers and is also preferably layered into a physical layer, a data link layer, a network layer, a transport layer, a session layer, a presentation layer, an application layer in the bottom-up order.

Further, in the computer-readable recording medium having a network unauthorized access analysis program recorded thereon according to the present invention, the data collecting procedure includes: a data collection processing procedure for capturing a packet to apply data processing thereto and supplying it to the data creating procedure; and a data collection controlling procedure for controlling the data collection processing of the data collection processing procedure.

Furthermore, in the computer-readable recording medium having a network unauthorized access analysis program recorded thereon according to the present invention, the data creating procedure includes: a layered modules procedure for creating analysis data by filtering the packet from the data collecting procedure based on the setting and reassembling the fragmented data which is the packet into its original data; and control managing procedure for controlling and managing the layered modules by setting parameters of the layered modules according to a layered protocol based on information specified by a previously-read configuration file. This control managing procedure includes: a data creation controlling procedure for creating data in each layer module; a memory controlling procedure for controlling storage of data in each layer module; and an analyzer managing procedure for outputting analysis data.

Moreover, in the computer-readable recording medium having a network unauthorized access analysis program recorded thereon according to the present invention, the data analyzing procedure includes a procedure for analyzing whether there is an unauthorized access to data of the sessions in application layer.

Therefore, according to the network unauthorized access analysis method, network unauthorized access analysis apparatus utilizing this method and computer-readable recording medium having a network unauthorized access analysis program recorded thereon of this invention, the following advantages can be obtained.

(1) Reassemblage of sessions can reach to an arbitrary layer such as the application layer, and data which is comprehensible to a person in charge of unauthorized access analysis can be processed. In other words, although the fragmented data which is the packet on the network is difficult to be analyzed, since reassemblage of sessions can reach to the application layer in the network unauthorized access analysis system according to the present invention, the analysis data can have a significance. This facilitates judgment on existence/absence of an unauthorized access in data. Further, unauthorized accesses on the network are usually generated in the data portion, and hence unauthorized access analysis can be performed with the good efficiency by detecting unauthorized accesses in such a data portion.

(2) Realization of the complete module in accordance with each layer causes various kinds of protocols to be used. That is, the network protocols can be modeled like a layered model shown in FIG. 5, and this model is used to create the analysis data based on the setting of the configuration file in the data creating step, the data creating section or the data creating procedure. Thus, even if a new protocol is developed, it can be used by changing only a part of a layer module that is in charge of a layer associated with the new protocol in the data creating step, the data creating section or the data creating procedure. Therefore, it is unnecessary to change the overall data creating step, data creating section or the data creating procedure in order that the data creating step, data creating section or the creating procedure can use the newly-developed protocol, thereby easily coping with an increase in a number of protocols.

(3) Since unauthorized access analysis in the data analyzing step, the data analyzing section or the data analyzing procedure is executed based on a detection method described in the configuration file, generation of a new type of unauthorized access can be detected by only changing the description in the configuration file without changing a software itself in the data analyzing step, the data analyzing section or the data analyzing procedure.

(4) Combined use of a buffering area network causes arbitrary communication to be performed. For example, when there are a plurality of LAN stations or external networks, unauthorized access analysis can be performed with respect to arbitrary source and destination.

(5) Being independent from the host as the buffering area network, it is possible to cope with an increase in a number of hosts.

In addition, in the network unauthorized access analysis method according to the present invention, the data creating step includes a filtering processing step for executing a layer-structured filtering and a reassemblage processing step for executing a layer-structured reassemblage.

Further, in the network unauthorized access analysis apparatus according to the present invention, the data creating section includes a filtering processing section for executing a layer-structured filtering and a reassemblage processing section for executing a layer-structured reassemblage.

Furthermore, in the computer-readable recording medium having a network unauthorized access analysis program recorded thereon according to the present invention, the data creating procedure includes a filtering processing procedure for executing a layer-structured filtering and a reassemblage processing procedure for executing a layer-structured reassemblage.

In these cases, in the data creating step, the data creating section or the data creating procedure, the filtering processing step, the filtering processing section or the filtering processing procedure collectively executes the filtering processing in accordance with a number of layers in advance and the reassemblage processing step, the reassemblage processing section or the reassemblage processing procedure then executes the reassemblage processing on each layer. Accordingly, since the data which is not to be analyzed is rapidly wasted, the unnecessary reassemblage processing or exclusive use of the memory is eliminated, thereby increasing the speed of the operation of the network unauthorized access analysis.

BRIEF DESCRIPTION OF DRAWINGS

FIG. 4 is an explanatory view showing an example of a configuration file for use in the network unauthorized access analysis system;

FIG. 9 is a view for showing a result of the processing in the network unauthorized access analysis system;

DESCRIPTION OF PREFERRED EMBODIMENTS

Figure 2:
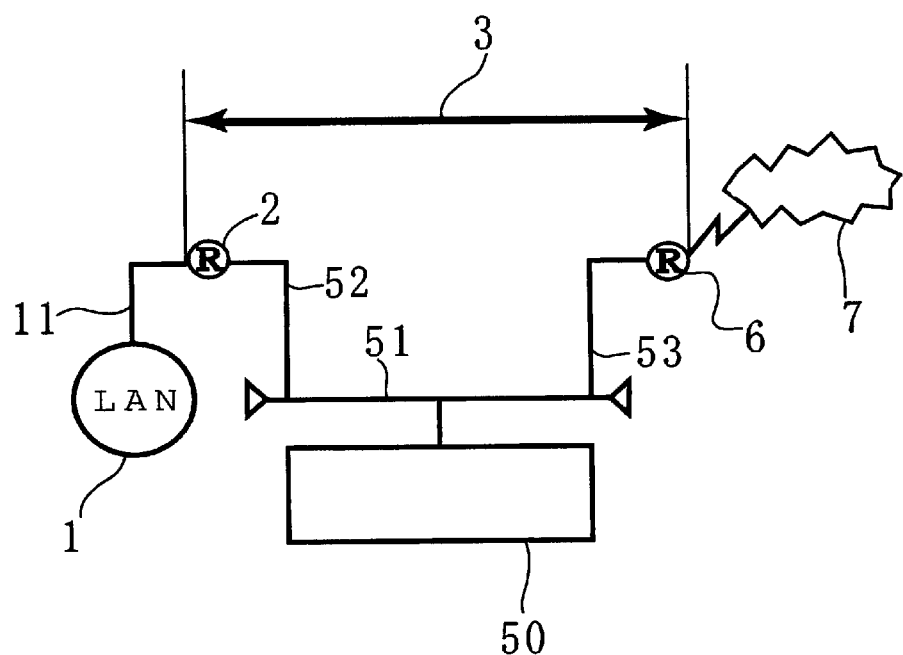
FIG. 2 is a block diagram showing a connection between the network unauthorized access analysis system with a network.

The configuration of the present invention will now be described in detail in connection with an example of an illustrative preferred embodiments. FIG. 2 shows an example of a network system to which the network unauthorized access analysis method and the network unauthorized access analysis apparatus utilizing this method of the present invention are applied.

In FIG. 2, reference numeral 1 denotes a local area network (referred to as "LAN" hereinbelow), and a buffering area network 3 is connected to the LAN 1 through a router 2. The buffering area network 3 is connected to an external network 7 through a router 6.

In this embodiment, the LAN 1 includes a plurality of stations (not shown), a network (not shown) for connecting these stations, and an external connection line 11 for connecting to the outside. The external connection line 11 is connected to the router 2. However, the LAN 1 is not restricted to one described above and may be composed of a single station.

The buffering area network 3 includes a network unauthorized access analysis system 50 for realizing the network unauthorized access analysis method according to the present invention, a common bus 51, and an external connection lines 52 and 53. The network unauthorized access analysis system 50 is connected to the common bus 51. The external connection line 52 connects the router 2 with the common bus 51. The external connection line 53 connects the common bus 51 with the router 6.

In addition, the network unauthorized access analysis system 50 is constituted by a computer system as similar to the prior art network unauthorized access analysis system. Although not shown, the computer system generally includes: a central processing unit for executing, e.g., various arithmetic operations; a main memory for storing programs or data required for executing the arithmetic operations; various kinds of interface such as input/output ports; a hard disk drive unit or the like for storing a program for realizing the network unauthorized access analysis systems and various data or constants required for executing such a program; an input device for inputting data or necessary commands; and an output device for outputting a result of processing performed in the central processing unit.

Figure 3:
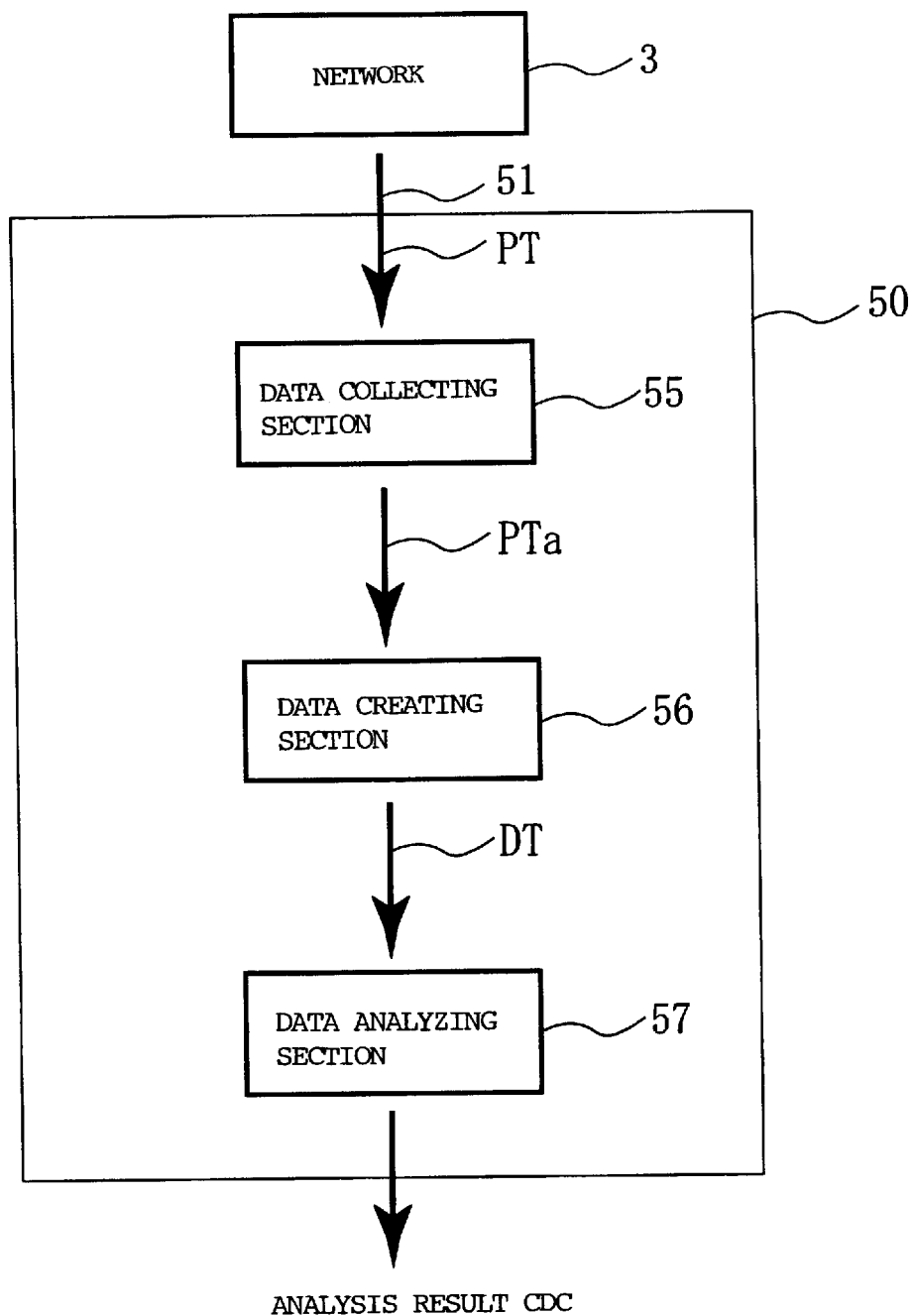
FIG. 3 is a schematic block diagram sowing the network unauthorized access analysis system.

FIG. 3 shows a preferred embodiment of the network unauthorized access analysis method according to the present invention. In FIG. 3, the network unauthorized access analysis system 50 is realized when the central processing unit execute the network unauthorized access analysis program stored in the main memory and this is a system for analyzing an unauthorized access in the network so constructed as to perform communication by using a layered protocol between information communication stations. That is, the network unauthorized access analysis system 50 comprises a method includes: a data collecting step for capturing a packet PT transmitted on a buffering area network 3; a data creating step for creating analysis data DT by filtering and reassembling a packet PTa fed from the data collecting step by using the layered modules; and a data analyzing step for judging whether an unauthorized access is generated in the analysis data DT from the data creating step to output an analysis result CDC, for example. And the network unauthorized access analysis system 50 includes: a data collecting section 55 for executing the data collecting step; a data creating section 56 for executing the data creating step; and a data analyzing section 57 for executing the data analyzing step for example.

Figure 1:
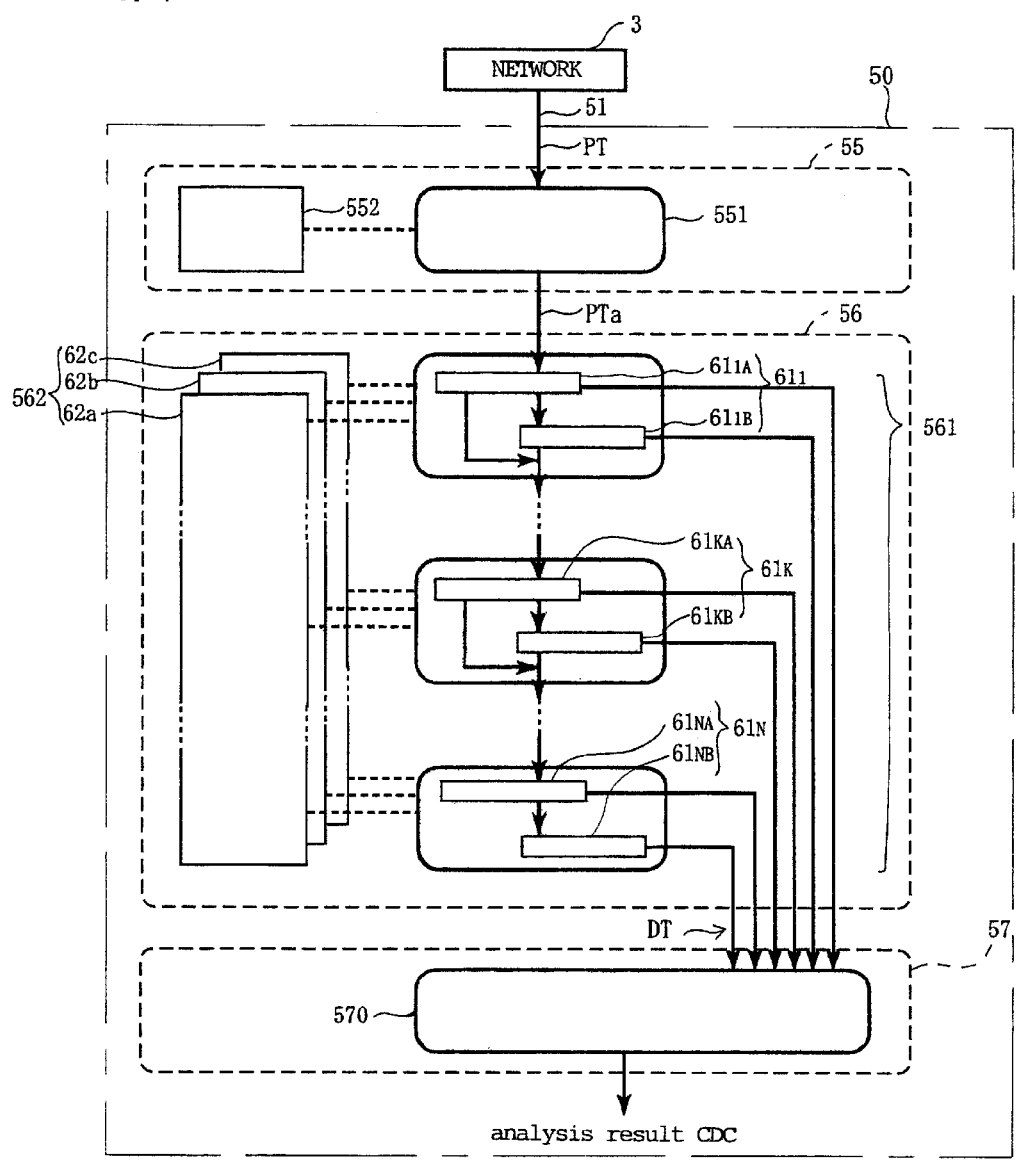
FIG. 1 is a block diagram showing an embodiment of a network unauthorized access analysis system to which a network unauthorized access analysis method according to the present invention is applied.

FIG. 1 shows the structure of the network unauthorized access analysis system 50 in detail. The data collecting step includes a data collection processing step for capturing a packet PT transmitted between the buffering area networks 3, and a data collection controlling step for controlling the data collection processing of the data collection processing step, for example. In FIG. 1, the data collecting section 55 includes a data collection processing section 551 for executing a data collection processing step and a data collection controlling section 552 for executing a data collection controlling step. The data collection processing step supplies a collected packet PT to the data creating step. That is, the data collection processing section 551 supplies a collected packet PT to the data creating section 56.

The data creating section 56 sets parameters of the layered modules according to the layered protocol based on information specified by a previously-read configuration file and filters the packet PTa from the data collecting section 55 by using the layered modules to reassemble the fragmented data which is the packet PTa into the original data, thereby executing the data creating step for creating the analysis data DT.

The data creating step includes a layered modules step for creating analysis data by filtering the packet from the data collecting step based on the setting and reassembling the fragmented data which is the packet into its original data; and control managing step for controlling and managing the layered modules by setting parameters of the layered modules according to a layered protocol based on information specified by a previously-read configuration file.

The data creating section 56 is roughly included of layered modules 561 for executing the layered modules step and a control managing section 562 for executing the control managing step for controlling to manage the layered modules 561. The control managing section 562 can set parameters of the layered modules 561 according to the layered protocol based on the information specified by the previously-read configuration file. Further, the layered modules 561 is capable of filtering the packet PTa from the data collecting section 55 based on the setting and reassembling the fragmented data which is the packet PTa to create the analysis data DT.

The layered modules 561 is constituted by a plurality of layer modules, i.e., a 1-layer module $61_1$, ..., a k-layer module $61_k$, ..., and an N-layer module $61_N$. Here, N is an arbitrary integer and k is an arbitrary integer from 1 through N.

As to the 1-layer module $61_1$, a 1-layer filter $61_{1A}$ and a 1-layer reassemblage section $61_{1B}$ are constituted in accordance with the content of the read configuration file. In case of the k-layer module $61_k$, a k-layer filter $61_{kA}$ and a k-layer reassemblage section $6_{kB}$ are formed in accordance with the content of the read configuration file. The N-layer module $61_N$ can have an N-layer filter $61_{NA}$ and an N-layer reassemblage section $61_{NB}$ formed in accordance with the content of the read configuration file. The respective layer modules $61_1$, ..., $61_k$, ..., $61_N$ are sequentially processed in the mentioned order.

The control managing step includes: a data creation controlling step for creating data in the respective layer modules $61_1$, ..., $61_k$, ..., $61_N$; a memory controlling step for controlling storage of data in the respective layer modules $61_1$, ..., $61_k$, ..., $61_N$; and an analyzer managing step for outputting the analysis data DT.

The control managing section 562 includes: a data creation controlling section 62a for executing the data creating controlling step for creating data in the respective layer modules $61_1$, ..., $61_k$, ..., $61_N$; a memory controlling section 62b for executing the memory controlling step for controlling storage of data in the respective layer modules $61_1$, ..., $61_k$, ..., $61_N$; and an analyzer managing section 62c for executing the analyzer managing step for outputting the analysis data DT. The control managing section 562 controls and manages the 1-layer module $61_1$, ..., the k-layer module $61_k$, ..., and the N-layer module $61_N$, respectively.

The data analyzing section 57 judges whether an unauthorized access is generated in the analysis data DT fed from the data creating section 56 based on the content specified by the previously-read configuration file for outputting the analysis result CDC to execute the data analyzing step.

The data analyzing step includes a step for analyzing whether there is an unauthorized access to data of the sessions in application layer. The data analyzing section 57 is provided with an application analyzer 570 for executing the step for analyzing whether an unauthorized access executes to data of the sessions in application layer. The application analyzer 570 analyzes whether there is an unauthorized access in the filtered and reassembled data DT based on the content given in the previously-read configuration file.

FIG. 4 shows an example of the configuration file. As shown in FIG. 4, information for specifying the data DT transferred from the data creating section 56 to the data analyzing section 57 or information analyzed in the data analyzing section 57 can be written in the configuration file 500 and, for example, information such as shown in FIG. 4 can be written in this file.

Figure 5:
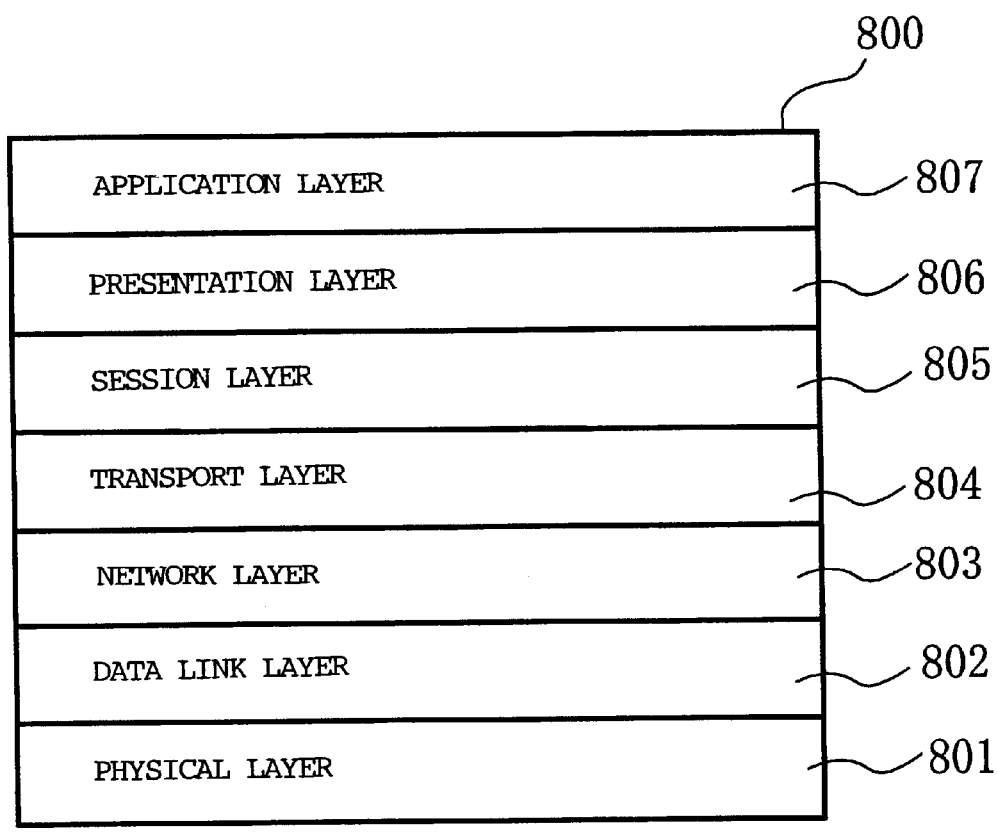
FIG. 5 is a view for explaining an example of layering a protocol of the network unauthorized access analysis system.

FIG. 5 shows an example of a 7-layer model of an Open System Interconnection (OSI). In the layered model 800 shown in the drawing, seven communication functions of the open system are layered, in which a physical layer 801, a data link layer 802, a network layer 803, a transport layer 804, a session layer 805, a presentation layer 806 and an application layer 807 form a layer.

In the physical layer 801, its physical conditions or electrical conditions required for bit transmission are determined. In the data link layer 802, a data transmission error control procedure and others are determined. The network layer 803 is provided for enabling data transmission between the both end systems through various communication nets such as a public packet exchange. The transport layer 804 is used for performing transparent data transfer between the both end systems with the high reliability. The session layer 805 is provided for establishing synchronization or controlling selection of a transmission mode or a transmission priority in order to efficiently effect interaction in the application process between the both end systems. The presentation layer 806 controls a data format for accurately and efficiently transferring data used in the application process in the both end systems. The application layer 807 is provided for executing application service requests such as file transfer, execution of a message communication processing system or access to a subordinate terminal or a remote database in accordance with various applications executed by users.

Figure 6:
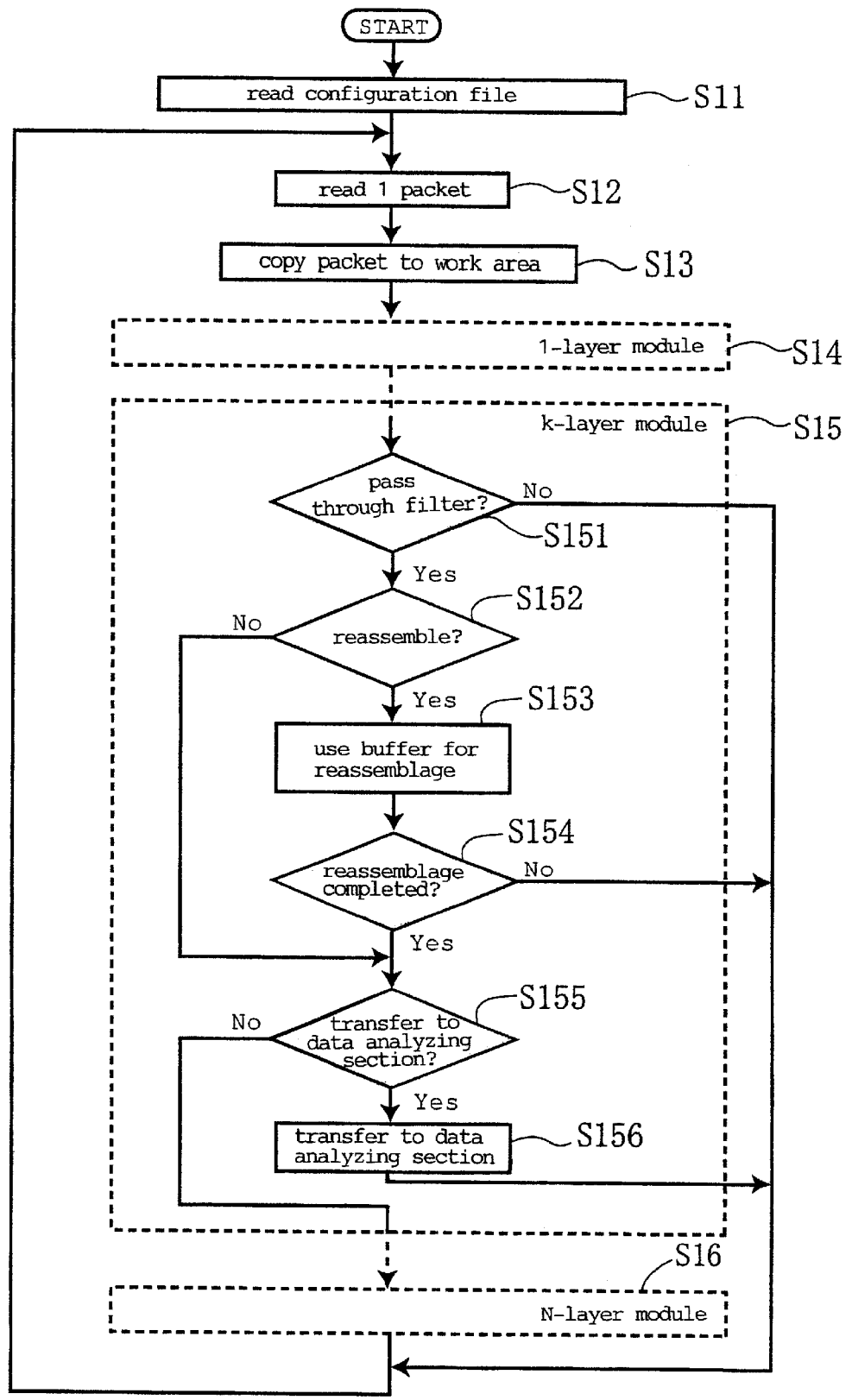
FIG. 6 is a flowchart for explaining the operation of the network unauthorized access analysis system.
Figure 7:
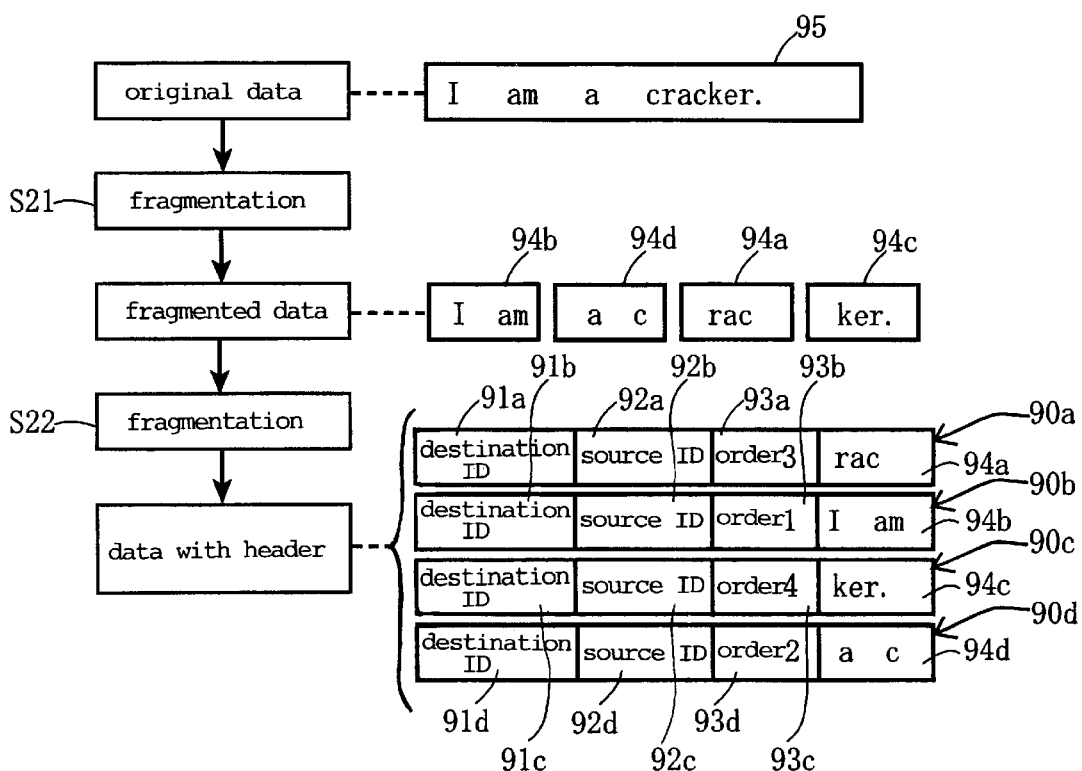
FIG. 7 is a view for explaining the operation of the network unauthorized access analysis system.
Figure 8:
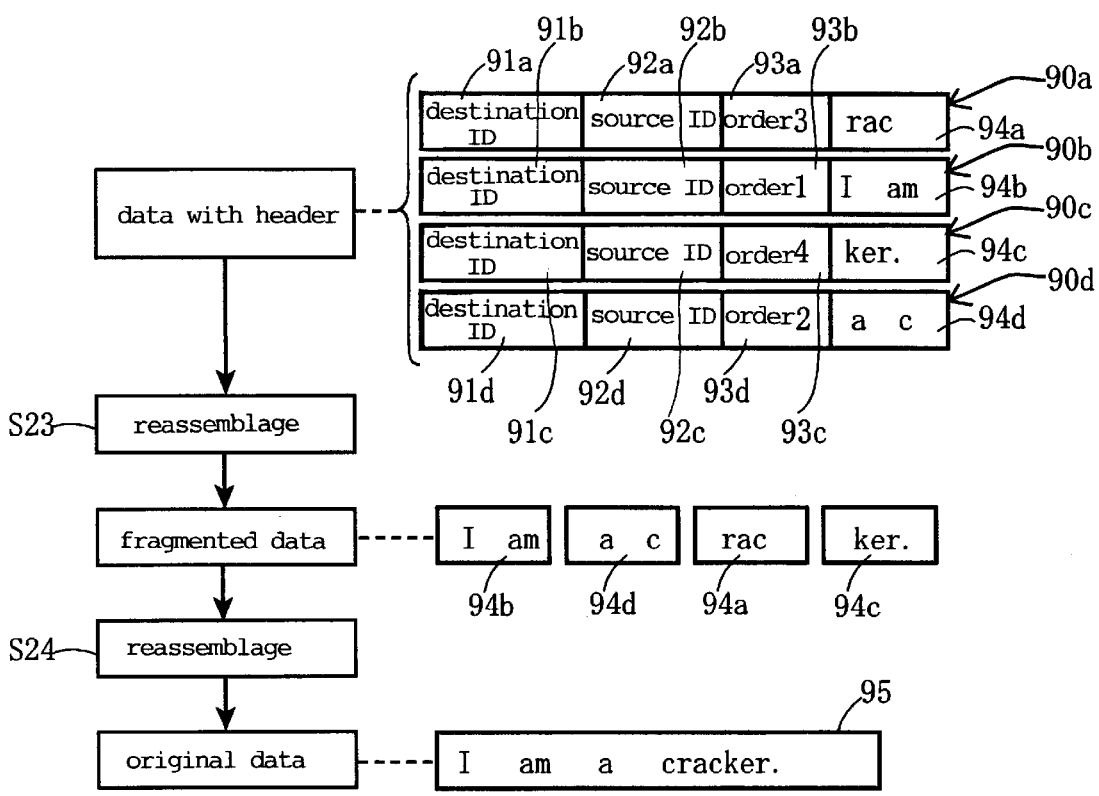
FIG. 8 is a view for explaining the operation of the network unauthorized access analysis system.

The operation of the network unauthorized access analysis system 50 having the above arrangement will now be described with reference to FIGS. 6 through 8. FIG. 6 is a flowchart for explaining the operation of the system 50. FIGS. 7 and 8 show an example of the content of the data processed by the system 50.

Here, it is assumed that a plurality of data packets, e.g., communication data 90a, 90b, 90c and 90d constituting the information or data having one significance are transmitted through the common bus 51 of the buffering area network 3.

The communication data 90a, 90b, 90c and 90d are composed of destination Ids 91a, 91b, 91c and 91d, source Ids 92a, 92b, 92c and 92d, orders 93a, 93b, 93c and 93d, and data 94a, 94b, 94c and 94d.

The communication data 90a transmitted through the common bus 51 is configured in the following manner. That is, the data 95 "I am a cracker." in the application layer is fragmented (step (S) 21) and divided into the data 94b "I am", the data 94d "a c", the data 94a "rac" and the data 94c "ker.", for example. The data is further fragmented (S22) into the communication data with headers 90a, 90b, 90c and 90d, and these data are to be transferred on the network by the layered model 800 shown in FIG. 5. The data unit on the buffering area network 3 corresponds to the communication data 90a, 90b, 90c and 90d. This data unit is to be transferred through the common bus 51 of the buffering area network 3.

As shown in FIG. 6, the network unauthorized access analysis system 50 reads the configuration file (S11). This causes the parameters associated with the data, which are to be transferred to the data analyzing section 57 or which are to be filtered and reassembled, to be set in the 1-layer filter $61_{1A}$ and the 1-layer reassemblage section $61_{1B}$ of the 1-layer module $61_1$, ..., the k-layer filter $61_{kA}$ and the k-layer reassemblage section $61_{kB}$ of the k-layer module $61_k$, ..., and the N-layer filter $61_{NA}$ and the N-layer reassemblage section $61_{NB}$ of the N-layer module $61_N$ in the data creating section 56. Further, this configuration file is used to set the information to be analyzed in the data analyzing section 57.

Here, a value of N is determined depending on the layer to which reassemblage of data reaches in the layered model 800 in FIG. 5. In this embodiment, it is assumed that N=7 and the data is reassembled to the sessions in the application layer, that is into a previously-set layer. However, the value is not restricted to N=7, and N=3 may be determined to reassemble the data of the sessions in the network layer. In any case, N can be set to reassemble the data in sessions required for data analysis.

The data collecting section 55 captures one packet (for example, the communication data 90a) of the packets PT transmitted through the common bus 51 under control of the data collection controlling section 552 (S12), and this one packet is copied in a working area provided in a main memory, a hard disk drive or the like in the computer system (S13). This causes the one packet copied in the working area to be captured into the 1-layer module $61_1$ of the layered modules 561 and subjected to the processing of the first layer in accordance with the information in the configuration file so as to be transferred to the subsequent layer module (S14). In the 1-layer module 611, values in various fields of a header in the packet are compared with parameters having passed through the filter and specified by the configuration files in order to execute the processing for selecting the data specified by the configuration file or pass the data. In addition, no change is made to the data in the processing for passing the data through the filter.

Respective processes are similarly performed on each layer module lower than the 1-layer module $61_1$ in accordance with the content in the configuration file as in the above description.

The k-layer module $61_k$ receives a result obtained from the process executed by the module followed by the k-layer module $61_k$.

The detailed description will now be given as to the k-layer module $61_k$ as an example because the same processes are performed in the respective layer modules $61_1, \ldots, 61_k, \ldots, 61_N$.

Since the parameters indicating whether the received data is passed through the k-layer filter $61_{kA}$, whether the k-layer reassemblage section $61_{kB}$ is operated or whether the reassembled or non-reassembled data is transferred to the data analyzing section 57 are set in accordance with the information in the previously-read configuration file, the k-layer module $61_k$ executes the processing associated with those parameters (S15).

For example, assuming that each parameter is set by specification given in the information in the configuration file, the k-layer module $61_k$ passes the data resulting from the processing carried out by the upper layer module through the k-layer filter $61_{kA}$ (S151; YES). Subsequently, when reassembling the data (S152; YES), the k-layer module $61_k$ reassembles the data by using the buffer (S153), and when the data reassemblage process does not reach to the application layer (S154; NO), the data is output from the k-layer module $61_k$. The next packet is then read (S12).

In addition, when reassemblage is carried out by using the buffer (S153) and then completed (S154; YES), the data is stored in the buffer of the k-layer reassemblage section $61_{kB}$. In this case or the case where the data is not reassembled (S152; NO), the data stored in the buffer of the k-layer reassemblage section $61_{kB}$ is transferred to the data analyzing section 57 (S156) with a timing for transferring the reassembled data to the data analyzing section 57 (S155; YES). Moreover, the data is transferred to the upper layer modules with a timing for not transferring the data to the data analyzing section 57 (S155; NO).

As a result of the processing in the upper layer modules above the k-layer module $61_k$, the data is reassembled as shown in FIG. 8 (S23) and the data "rac" 94a is transferred to the data analyzing section 57 as the divided data.

Repeating the above-mentioned processing for each packet (S13 through S16) involves the packet PT which is a data unit on the network to be reassembled as shown in FIG. 8 (S23) so that the data be divided into the data 94b "I am", the data 94d "a c", the data 94a "rac" and the data 94c "ker." These are further reassembled into the original data 95 "I am a cracker." in the application layer.

Assuming that the lower layer modules have each parameter set by the information in the configuration file as described above, the data is transferred to the N-layer filter $61_N$.

The N-layer filter $61_N$ processes the data received according to the parameters set by the information in the configuration file as mentioned above and transfers it to the data analyzing section 57 as the analysis data DT (S16).

Further, when the flowchart is used, setting a variety of filters can simultaneously monitor various kinds of cracking.

In the data analyzing section 57, the application analyzer 570 judges whether an unauthorized access is generated in the analysis data DT fed from the data creating section 56 based on the information specified by the previously-read configuration file. A result obtained from judgment made by the application analyzer 570 is shown on, e.g., a display as an image 900 shown in FIG. 9.

Here, the application analyzer 570 adopts either or both of the following unauthorized access analyzing processes. It is, however, needless to say that the invention is not restricted to these processing methods.

(i) A type of operation that can cause an unauthorized access to be generated with a protocol occupying the attention is confirmed and the procedure of this operation is written in the configuration file for the application analyzer 570 in advance. If the analysis data DT coincides with the procedure written in the configuration file as a result of comparison, the judging process is executed to determine that the communication is false.

(ii) Files, programs and others that must be strictly managed for security are written in the configuration file for the application analyzer 570 in advance. When a change is found in a written resource, the judging process is executed to determine that the communication is irregular.

According to the above-mentioned network unauthorized access analysis system 50, the following unauthorized accesses (cracking) can be prevented, for example.

(1) Speculating a sequence number of the TCP protocol and assuring a false session in order to make unauthorized access to files of a target host.

(2) Using a DEBUG command of the SMTP protocol in order to make unauthorized access to files of a target host.

(3) Rewriting a security management file of a target host by using MIME in order to enable login to a target host without a password.

(4) Sending a vast amount of E-mails or news that are beyond the processing capability of a target host in order to hamstring the network function.

(5) Making access to a notable account such as a root or a guest by using the telnet protocol and speculating a password to try login.

(6) Using the TFTP protocol to make access to files of a target host without a password.

According to the network unauthorized access analysis system 50 of this embodiment having the above arrangement, the following advantages can be obtained.

(1) Reassemblage of sessions can reach to the application layer, and the data that is comprehensible to a person who analyzes the unauthorized access can be processed. That is, although analysis is difficult because the packet on the network is the data fragmented, reassemblage of sessions reaching to the application layer can cause the analysis data to have a significance in the network unauthorized access analysis system 50 according to this embodiment. This leads to easy judgment upon existence/absence of an unauthorized access to the data. Further, many unauthorized accesses observed in the network are generated in the data portion, detecting such an unauthorized access in the data portion results in the efficient unauthorized access analysis.

(2) Realizing complete module for each layer made it possible to use various kinds of protocol. That is, since the network protocol can be modeled as shown by the layered model 800 in FIG. 5 and the network unauthorized access analysis system 50 according to this embodiment executes the unauthorized access analysis by utilizing this model based on the setting of the configuration file, even if a new protocol is developed, such a protocol can be used by changing only a or more given layer modules which are in charge of a layer of the configuration file and the data creating section 56 with which the new protocol is associated. Accordingly, it is not necessary to change the entire data creating section 56 in order to associate the data creating section 56 with the newly-developed protocol, thereby easily dealing with an increase in a number of protocols.

(3) Unauthorized access analysis is executed in the data analyzing section based on a detection method written in the configuration file, and hence generation of a new kind of unauthorized access can be detected by changing only the description in the configuration file without changing the software itself of the data analyzing section.

(4) Combination with the buffering area network 3 made it possible to deal with arbitrary communication. For example, when there are a plurality of stations of the LAN 1 or the external networks 7, unauthorized access analysis can be carried out with respect to arbitrary source and destination.

(5) The buffering area network 3 is provided independently from the host, the present invention can readily deal with an increase in a number of hosts.

Figure 10:
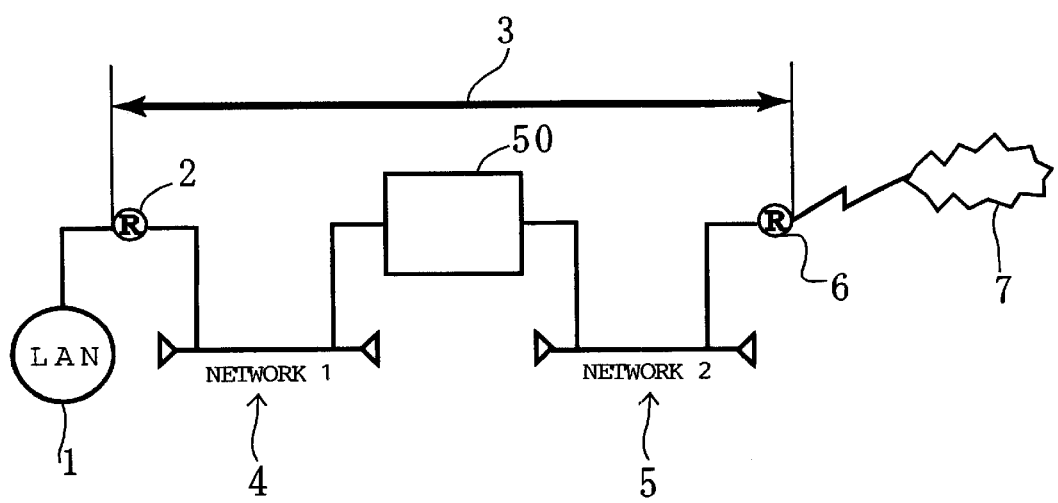
FIG. 10 is a block diagram showing another embodiment of the network unauthorized access analysis system.

Although the above has described one preferred embodiment according to the present invention, the invention is not restricted thereto and various modifications and other embodiments are possible within the true scope and spirit of the invention. For example, as shown in FIG. 10, a plurality of network interfaces may be provided to the network unauthorized access analysis system 50 to realize a multiform. For example, when the network unauthorized access analysis system 50 has two network interfaces to be connected with different networks 4 and 5, communication established between the LAN 1 and the external network 7 comes to necessarily pass through the network unauthorized access analysis system 50. Therefore, all the packets can be collected by the network unauthorized access analysis system 50 entirely. This enables detection of unauthorized accesses on the network with the high accuracy.

Figure 11:
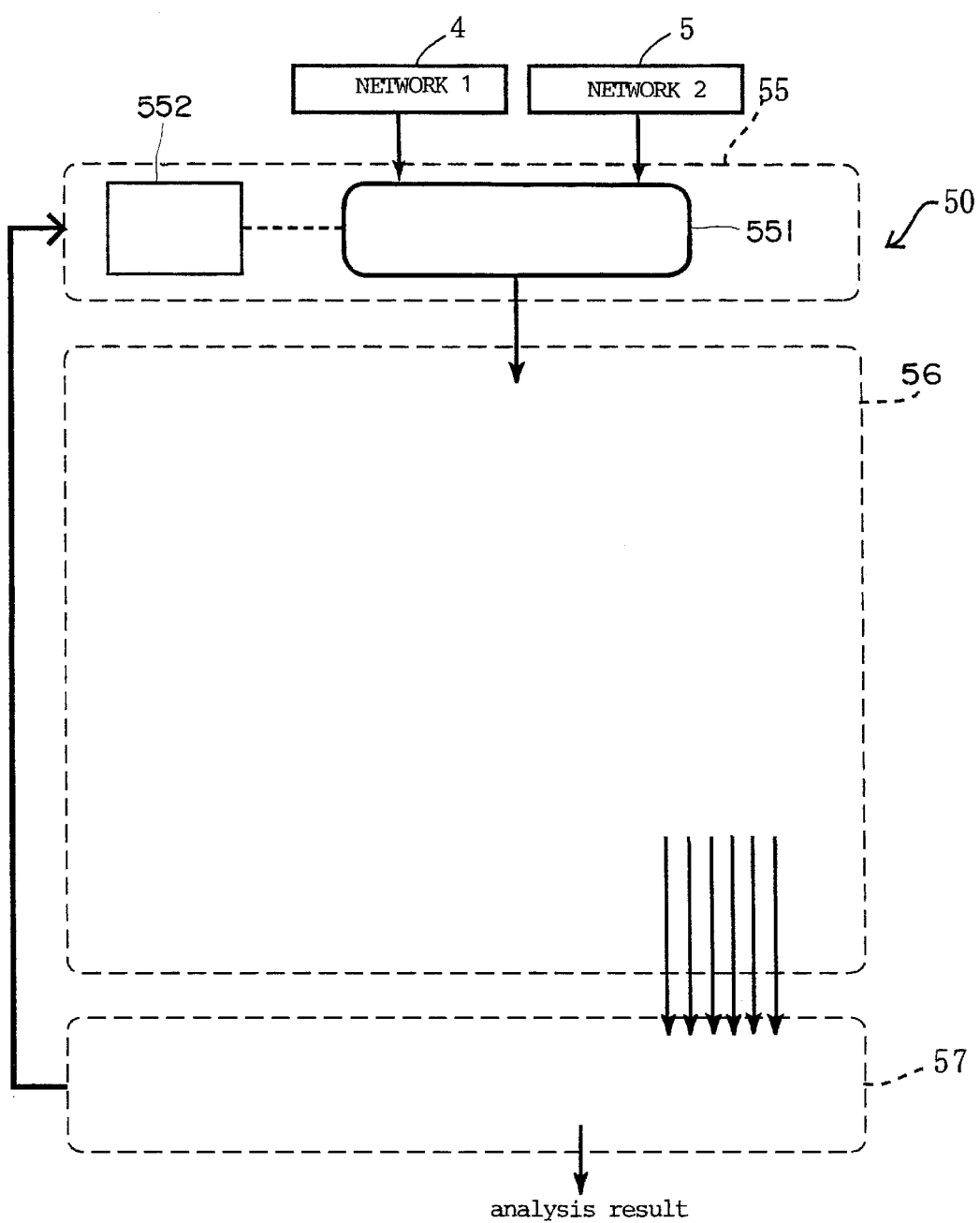
FIG. 11 is a block diagram showing still another embodiment of the network unauthorized access analysis system.

Further, as shown in FIG. 11, multiform of the network unauthorized access analysis system 50 may be realized and analysis result may be fed back from the data analyzing step to the data collecting step. That is, analysis result may be fed back from the data analyzing section 57 to the data collecting section 55. It is to be noted that the specific illustration of the data creating section 56 and the data analyzing section 57 is omitted in FIG. 11.

In this case, the processing executed in the data collecting step varies depending on a result of analysis effected by the data analyzing step. That is, the processing executed in the data collecting section 55 varies depending on a result of analysis effected by the data analyzing section 57. Thus, if any session, host or the like in which an unauthorized access is observed can be specified, it is possible to control the data collecting section 55 or step so as not to pass the communication through the network unauthorized access analysis system 50. This can therefore prevent the unauthorized access to the LAN 1 on the network.

Figure 12:
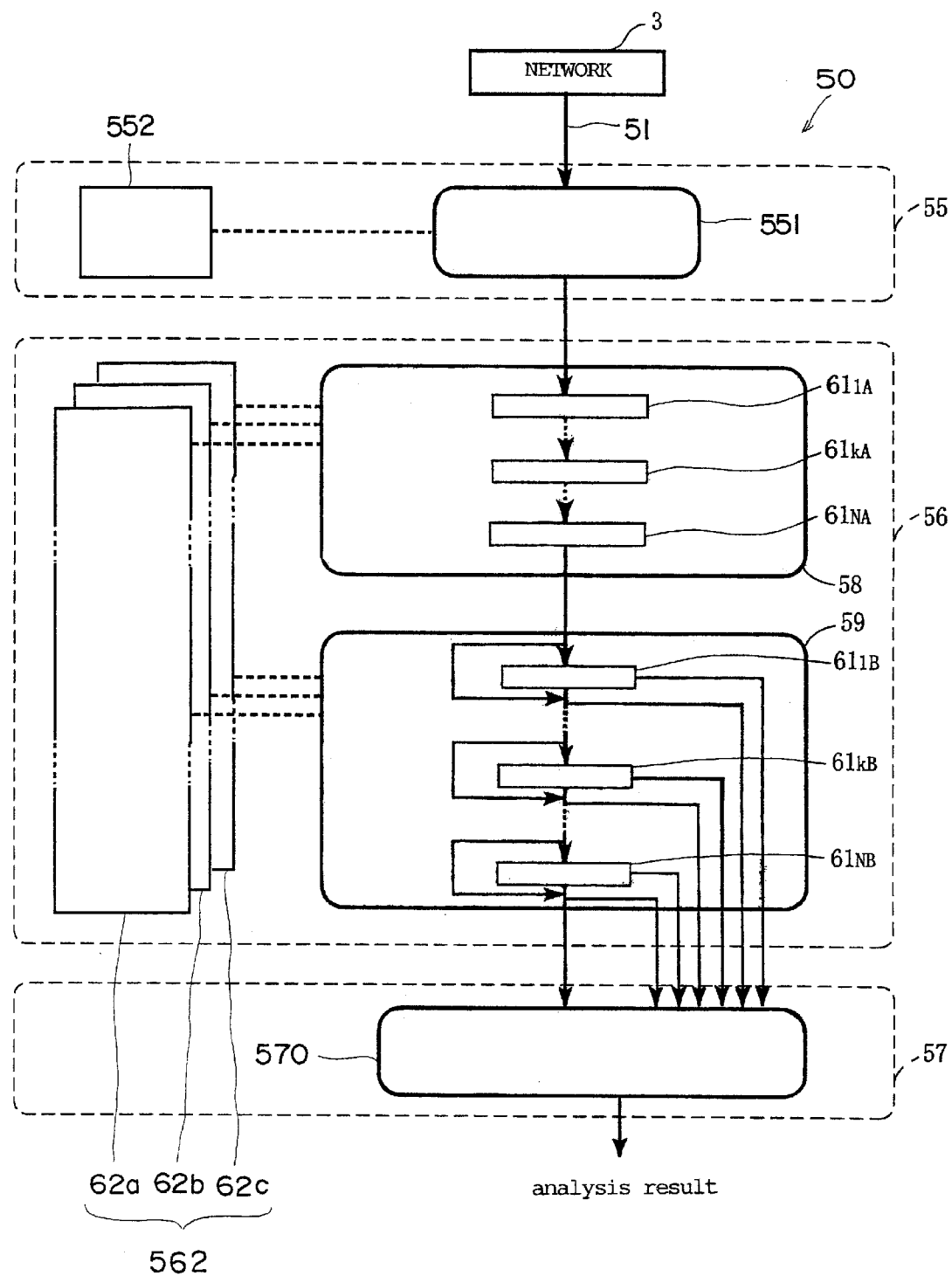
FIG. 12 is a block diagram showing a further embodiment of the network unauthorized access analysis system.

Moreover, as shown in FIG. 12, the data creating section 56 may be provided with a filtering processing section 58 having layer-structured layer filters $61_{1A}, \ldots, 61_{kA}, \ldots, 61_{NA}$, and a reassemblage processing section 59 having layer-structured layer reassemblage sections $61_{1B}, \ldots, 61_{kB}, \ldots, 61_{NB}$. That is, the data creating step includes: a filtering processing step for executing a layer-structured filtering and a reassemblage processing step for executing a layer-structured reassemblage. In this case, in the data creating section 56, the filtering processing section 58 collectively executes the filtering processing in accordance with a number of layers in advance and the reassemblage processing section 59 then executes the reassemblage processing on each layer. Accordingly, since the data which is not to be analyzed is rapidly wasted, the unnecessary reassemblage processing or exclusive use of the memory is eliminated, thereby increasing the speed of the operation of the network unauthorized access analysis system 50.

Although the network unauthorized access analysis system 50 in each of the foregoing embodiments is constituted by the computer system, the present invention is not limited thereto. For example, a computer-readable recording medium such as a CD-ROM or a floppy disk having a program for causing a computer to execute the data collecting step, the data creating step and the data analyzing step in the above network unauthorized access analysis method recorded thereon may be used to operate a general computer in order to effect the network unauthorized access analysis system.

Specifically, the program described herein causes the computer to execute: the data collecting step, i.e., the data collecting procedure for capturing packets transmitted on a network so constructed as to perform communication between information communication stations by using a layered protocol; the data creating step, i.e., the data creating procedure for setting parameters of the layered modules according to the layered protocol based on information specified by a previously-read configuration file and reassembling the fragmented data which is the packet into its original data by filtering the packet obtained from the data collecting procedure by using the layered modules in order to create the analysis data; and the data analyzing step, i.e., the data analyzing procedure for judging whether an unauthorized access is generated in the analysis data obtained from the data creating procedure based on the content specified by the previously-read configuration file.

Further, the data collecting procedure includes: a data collection processing procedure for executing the data collection processing step for capturing the packet and applying data processing thereon to supply to the data creating procedure; and a data collection controlling procedure for executing the data collection controlling step for controlling the data collection processing of the data collection processing procedure.

Furthermore, the data creating procedure includes: a layered modules procedure for executing the layered modules step for creating analysis data by filtering the packet from the data collecting procedure based on the setting and reassembling fragmented data which is the packet into its original data; and a control managing procedure for executing the control managing step for controlling and managing the layered modules procedure by setting parameters of the layered modules according to a layered protocol based on the information specified by a previously-read configuration file.

Moreover, the control managing procedure includes: a data creation controlling procedure for executing the data creation controlling step for creating data in each layer module; a memory controlling procedure for executing the memory controlling step for controlling storage of data in each layer module; and an analyzer managing procedure for executing the analyzer managing step for outputting analysis data.

Further, the data creating procedure includes: a filtering processing procedure for executing the filtering processing step and a layer-structured filtering and a reassemblage processing procedure for executing the reassemblage processing step and a layer-structured reassemblage.

Furthermore the data analyzing procedure includes a procedure for analyzing whether there is an unauthorized access to data of the sessions in application layer.

In addition, the present invention is not restricted to use of the above-mentioned general computer, and it is possible to adopt an independent apparatus including of a special computer for executing the data collecting step, the data creating step and the data analyzing step in the network unauthorized access analysis method.

What is claimed is:

1. A method for analyzing an unauthorized access on a network so constructed as to perform communication between information communication stations by using a layered protocol, the network unauthorized access analysis method comprising: a data collecting step for capturing a packet transmitted on the network; a data creating step for setting parameters of layered modules according to a layered protocol based on information specified by a previously-read configuration file and filtering the packet obtained from the data collecting step by using the layered modules to reassemble the-fragmented data which is the packet into a layer previously selected from any one of the layers used in the layered protocol in order to create analysis data; and a data analyzing step for judging whether an unauthorized access is generated in the analysis data obtained from the data creating step based on the content specified by the previously-read configuration file.

2. The network unauthorized access analysis method according to claim 1, wherein the layered modules includes a plurality of layer modules, for performing filtering and layer reassemblage in accordance with the content of the previously-read configuration file, in the form of a layer.

3. The network unauthorized access analysis method according to claim 2, wherein the layered modules is composed of seven layer modules and layered into a physical layer, a data link layer, a network layer, a transport layer, a session layer, a presentation layer and an application layers in the bottom-up order.

4. The network unauthorized access analysis method according to claim 2, wherein the data creating step includes: a filtering processing step for executing a layer-structured filtering and a reassemblage processing step for executing a layer-structured reassemblage.

5. The network unauthorized access analysis method according to claim 1, wherein the data collecting step includes: a data collection processing step for capturing the packet and applying data processing thereon to supply to the data creating step; and a data collection controlling step for controlling the data collection processing of the data collection processing step.

6. The network unauthorized access analysis method according to claim 1, wherein the data creating step includes: a layered modules step for creating analysis data by filtering the packet from the data collecting step based on the setting and reassembling fragmented data which is the packet into a previously-set layer; and a control managing step for controlling and managing the layered modules step by setting parameters of the layered modules according to a layered protocol based on the information specified by the previously-read configuration file.

7. The network unauthorized access analysis method according to claim 6, wherein the control managing step includes: a data creation controlling step for creating data in each layer module; a memory controlling step for controlling storage of data in each layer module; and an analyzer managing step for outputting analysis data.

8. The network unauthorized access analysis method according to claims 1, wherein the data analyzing step includes a step for analyzing whether there is an unauthorized access to data of the sessions in application layer.

9. An apparatus for analyzing an unauthorized access on a network so constructed as to perform communication between information communication stations by using a layered protocol, the network unauthorized access analysis apparatus comprising: a data collecting section for capturing a packet transmitted on the network; a data creating section for setting parameters of layered modules according to a layered protocol based on information specified by a previously-read configuration file and filtering the packet obtained from the data collecting section by using the layered modules to reassemble the fragmented data which is the packet into a layer previously selected from any one of the layers used in the layered protocol in order to create analysis data; and a data analyzing section for judging whether an unauthorized access is generated in the analysis data obtained from the data creating section based on the content specified by the previously-read configuration file.

10. The network unauthorized access analysis apparatus according to claim 9, wherein the layered modules includes a plurality of layer modules, to which layer filters and layer reassemblage sections are produced in accordance with the content of the previously-read configuration file, in the form of a layer.

11. The network unauthorized access analysis apparatus according to claim 10, wherein the layered modules consists of seven layer modules and layered into a physical layer, a data link layer, a network layer, a transport layer, a session layer, a presentation layer and an application layers in the bottom-up order.

12. The network unauthorized access analysis apparatus according to claim 10, wherein the data creating section includes: a filtering processing section for executing a layer-structured filtering and a reassemblage processing section for executing a layer-structured reassemblage.

13. The network unauthorized access analysis apparatus according to claim 9, wherein the data collecting section includes: a data collection processing section which captures the packet and applies data processing thereon for supplying to the data creating section; and a data collection controlling section for controlling the data collection processing of the data collection processing section.

14. The network unauthorized access analysis apparatus according to claim 9, wherein the data creating section includes: layered modules for creating analysis data by filtering the packet from the data collecting section based on the setting and reassembling fragmented data which is the packet into the previously-set layer; and a control managing section for controlling and managing the layered modules by setting parameters of the layered modules according to a layered protocol based on the information specified by the previously-read configuration file.

15. The network unauthorized access analysis apparatus according to claim 14, wherein the control managing section includes: a data creation controlling section for creating data in each layer module; a memory controlling section for controlling storage of data in each layer module; and an analyzer managing section for outputting analysis data.

16. The network unauthorized access analysis apparatus according to claim 9, wherein the data analyzing section includes an application analyzer for analyzing whether there is an unauthorized access to data of the sessions in application layer.

17. A computer-readable recording medium having a program recorded thereon for causing a computer to execute: a data collecting procedure for capturing a packet transmitted on a network so constructed as to perform communication between information communication stations by using a layered protocol; a data creating procedure for setting parameters of layered modules according to a layered protocol based on information specified by a previously-read configuration file and filtering the packet obtained from the data collecting procedure by using the layered modules to reassemble the fragmented data which is the packet into a layer previously selected from any one of the layers used in the layered protocol in order to create analysis data; and a data analyzing procedure for judging whether an unauthorized access is generated in the analysis data obtained from the data creating procedure based on the content specified by the previously-read configuration file.

18. The computer-readable recording medium having a program recorded thereon according to claim 17, wherein the layered modules includes a plurality of layer modules, for performing filtering and layer reassemblage in accordance with the content of the previously-read configuration file, in the form of a layer.

19. The computer-readable recording medium having a program recorded thereon according to claim 18, wherein the layered modules is composed of seven layer modules and layered into a physical layer, a data link layer, a network layer, a transport layer, a session layer, a presentation layer and an application layers in the bottom-up order.

20. The computer-readable recording medium having a program recorded thereon according to claim 19, wherein the data collecting procedure includes: a data collection processing procedure for capturing the packet and applying data processing thereon to supply to the data creating procedure; and a data collection controlling procedure for controlling the data collection processing of the data collection processing procedure.

21. The computer-readable recording medium having a program recorded thereon according to claim 20, wherein the data creating procedure includes: a layered modules procedure for creating analysis data by filtering the packet from the data collecting procedure based on the setting and reassembling fragmented data which is the packet into the previously-set layer; and a control managing procedure for controlling and managing the layered modules procedure by setting parameters of the layered modules according to a layered protocol based on the information specified by the previously-read configuration file.

22. The computer-readable recording medium having a program recorded thereon according to claim 21, wherein the control managing procedure includes: a data creation controlling procedure for creating data in each layer module; a memory controlling procedure for controlling storage of data in each layer module; and an analyzer managing procedure for outputting analysis data.

23. The computer-readable recording medium having a program recorded thereon according to claim 18, wherein the data creating procedure includes: a filtering processing procedure for executing a layer-structured filtering and a reassemblage processing procedure for executing a layer-structured reassemblage.

24. The computer-readable recording medium having a program recorded thereon according to claim 17, wherein the data analyzing procedure includes a procedure for analyzing whether there is an unauthorized access to data of the sessions in application layer.

* * * * *